United States Patent [19]

Yamada

[11] Patent Number: 5,680,018
[45] Date of Patent: Oct. 21, 1997

[54] METHOD AND APPARATUS FOR GENERATING RADIATION

[75] Inventor: Hironari Yamada, Higashikurume, Japan

[73] Assignee: Research Development Corporation of Japan, Japan

[21] Appl. No.: 552,130

[22] Filed: Nov. 2, 1995

[30] Foreign Application Priority Data

Nov. 16, 1994 [JP] Japan ................................. 6-281649
Jul. 13, 1995 [JP] Japan ................................. 7-177381

[51] Int. Cl.$^6$ ............................. H01S 3/30; H05H 13/04
[52] U.S. Cl. ....................... 315/500; 315/503; 315/507; 372/94
[58] Field of Search .................................. 315/500–507; 376/112, 111; 313/231.31, 231.71, 359.1, 361.1, 362.1; 250/452.2, 493.1, 503.1, 305; 372/2, 98, 94

[56] References Cited

U.S. PATENT DOCUMENTS 5,197,071  3/1993  Yamada ................................ 372/2

OTHER PUBLICATIONS

IEEE Journal of Quantum Electronics, vol. 27, No. 12, Dec. 1991 "Mode Structure and Amplification of Radiation in the Photon Storage Ring" Mima et al.
Rev. Sci. Instrum. 63(1), Jan. 1992, Compact Hard x–ray Source Based on the Photon Storage Ring, Yamada et al., pp. 741–744.
Nuclear Instr. and Meth. in Physics Research A 331 (1993) 566–571 "Features of the Compact Photon Storage Ring".
Nuclear Instr. and Meth. in Physics Research A 331 (1993) 395–400 "Behavior of the Te pii Mode in the Photon Storage Ring".
Nuclear Instr. and Meth. in Phystics Research A 304 (1991) 700–702 Novel Free Electron Laser Named Photon Storage Ring.
Nuclear Instr. and Meth. in Physics Research B79 (1993) 762–766 Compact Free Electron Laser Based on an Exact Circular Electron Storage Ring.
Japanese Journal of Applied Physics vol. 28, No. 9, Sep. 1989 L1665–1668.
IL Nuovo Oimento, vol. 58B, N.1, 11 Sep. 1979, pp. 160–178.

Primary Examiner—Sandra L. O'Shea
Assistant Examiner—Jay M. Patidar
Attorney, Agent, or Firm—Lorusso & Loud

[57] ABSTRACT

In a method of generating radiation, a gas having a pressure equal to or greater than $10^{-9}$ Torr is introduced into an electron orbit in an electron storage ring. The gas is ionized by a circulating electron beam, and the electron beam is focused by ions to accumulate a large current electron beam. Also, a target is disposed on an electron orbit in the electron storage ring, and the electron beam circulating along the electron orbit is caused to hit the target, thereby generating a bremsstrahlung and high-intensity radiation.

18 Claims, 9 Drawing Sheets

METHOD AND APPARATUS FOR GENERATING RADIATION

BACKGROUND OF THE INVENTION

1. Field of the Invention

The present invention relates to an electron storage ring, and more particularly to a method and apparatus for generating radiation in which a gas is charged or a solid target is inserted into an electron storage ring to generate high-intensity synchrotron radiation, coherent synchrotron radiation, a free-electron laser beam, or a high-intensity bremsstrahlung.

2. Description of the Related Art

Conventionally, the following techniques are known in the art.

In an electron storage ring, which is used in a synchrotron radiation source or an insertion type free-electron laser, an electron beam circulating in the electron storage ring is focused and stabilized by utilizing the focusing action provided by the high-order components of a magnetic field, or by optimizing the layout of deflecting magnets and four-pole magnets. Cooling of the electron beam, which is produced by radiation of light, and an RF accelerating mechanism also serve to stabilize the electron beam.

However, these techniques of focusing and stabilizing an electron beam are not expected to provide a sufficient focusing action and cooling action when the electron storage ring is of a low-energy, large-current type.

To generate high energy x-rays with an electron storage ring, it is necessary to use an electron beam having an energy greater than a few GeV, and superconductive deflecting magnets capable of generating a magnetic flux having a magnetic field strength reaching a few teslas.

Techniques of generating x-rays have been utilized in x-ray tubes and in rotary twin-cathode x-ray sources.

Coherent synchrotron radiation is generated by producing short pulses of about a picosecond with a linac. However, short pulses have never been generated by an electron storage ring.

In the conventional technique of stabilizing an electron beam, intrabeam scattering and instability of the beam become considerable when the electron beam has a low energy. In such a case, a large current cannot be accumulated because the ability to focus the electron beam is insufficient.

For the same reason, the phenomenon occurs in which the bunch length increases, and the pulsewidth increases accordingly.

In an insertion-type free-electron laser and a photon storage ring-type fee-electron laser, it is impossible to suppress the heating action of the electron beam produced by laser beam generation, so that the laser beam generation is quenched (Renieri's theorem).

Also, since an electron beam having a large energy and a superconductive device for generating a strong magnetic field are needed to generate high-intensity x-rays having a large energy by using an electron storage ring, the size of the apparatus unavoidably increases, so that the costs of the apparatus increase considerably.

A large installation space required by such a large apparatus also makes it difficult to utilize an electron storage ring in the fields of semiconductor manufacture and medical care.

SUMMARY OF THE INVENTION

An objection of the present invention is to solve the above-mentioned problems and to provide an improved method and apparatus for generating radiation using a compact electron storage ring of a low energy type in which a strong focusing action and/or a cooling action are additionally provided to accumulate a large current.

Another object of the present invention is to provide an improved method and apparatus for generating radiation using a compact electron storage ring of a low energy type suitable for an insertion-type free-electron laser or a photon storage ring-type free-electron laser. In the method and apparatus, the instability of a beam is suppressed, or an action of cooling an electron beam is added to stabilize the laser beam generation, or generation of coherent synchrotron radiation having a short wavelength becomes possible.

Still another object of the present invention is to provide an apparatus for generating radiation in which a target is provided on an electron orbit in an electron storage ring, and an electron beam is continuously or intermittently injected by using an injector, whereby a large current electron beam is accumulated, and high-intensity x-rays are generated due to a bremsstrahlung caused by the target and scattering of electrons.

To achieve the above-mentioned objects, the present invention provides a method of generating radiation, wherein a gas having a pressure equal to or greater than $10^{-9}$ Torr is introduced into an electron orbit in an electron storage ring so as to generate radiation by the action of an electron beam circulating in the electron storage ring and the gas.

The gas may be ionized to focus the electron beam, thereby accumulating a large current electron beam.

The electron beam circulating in the electron storage ring may be caused to collide with the gas so as to generate a bremsstrahlung.

The electron beam circulating in the electron storage ring may be caused to collide with the gas so as to ionize the gas and generate a bremsstrahlung, so that the bunch length of the electron beam is shortened to promote the generation of short pulse synchrotron radiation and coherent synchrotron radiation.

The electron beam circulating in the electron storage ring may be caused to collide with the gas so as to ionize the gas and generate a bremsstrahlung, thereby increasing the output of a laser.

Preferably, hydrogen gas is used as the gas.

An electron beam may be continuously injected from the outside without disturbing electrons on the center electron orbit in the electron storage ring so as to accumulate a large current electron beam.

The present invention provides another method of generating radiation, wherein a target is placed on an electron orbit in an electron storage ring so as to cause an electron beam circulating along the electron orbit to hit the target, thereby generating a bremsstrahlung and high-intensity radiation.

An electron beam may be continuously injected from the outside without disturbing electrons on the center electron orbit in the electron storage ring so as to accumulate a large current electron beam.

The present invention further provides an apparatus for generating radiation. The apparatus comprises an electron storage ring, means for introducing a gas into an electron orbit in the electron storage ring so as to adjust the gas pressure, means for ionizing the gas by using a circulating electron beam and causing ions to stay on the electron orbit, and means for continuously or intermittently injecting an electron beam by using an injector.

The electron storage ring may have a magnet, a particle accelerator and a beam duct, thereby stabilizing the electron beam to accumulate a large current electron beam, generating high-intensity radiation utilizing a bremsstrahlung caused by the scattering of the gas and electrons, and/or generating high-intensity synchrotron radiation including coherent synchrotron radiation.

The electron storage ring may be provided with an insertion-type free-electron laser utilizing a straight portion of the electron storage ring, or an optical resonator having no straight portion, so as to stabilize the electron beam, and accumulate a large current electron beam, thereby increasing the output of a laser.

The apparatus may be provided with means for injecting the electron beam without disturbing electrons on the center electron orbit in the electron storage ring.

The present invention provides another apparatus for generating radiation. The apparatus comprises an electron storage ring having a magnet, a particle accelerator, and a beam duct, means for introducing a target into an electron orbit of the electron storage ring, and means for continuously or intermittently injecting an electron beam by using an injector so as to accumulate a large current electron beam, and means for generating high-intensity radiation utilizing a bremsstrahlung caused by the target and scattering of electrons.

A thin film or a wire may be used as the target.

Preferably, a support for the target is provided with cooling means.

Preferably, the apparatus further comprises means for moving the target.

Preferably, the apparatus further comprises means for retracting the target from the electron beam orbit.

In the present invention as described above, a strong focusing action and/or a cooling action is added to an electron storage ring of a low energy type so as to obtain an electron storage ring of a low energy and a large current. Further, a gas is introduced into the beam duct of the electron storage ring which is usually maintained at a highly vacuum of $1 \times 10^{-10}$ Torr and the pressure of the gas is properly adjusted, thereby shortening the bunch length of the electron beam to accelerate the generation of synchrotron radiation of a short pulse, or coherent synchrotron radiation of a short wavelength, stabilizing the laser generation of a free electron laser, and generating a high-intensity bremsstrahlung. Preferably, a light element is used as the gas, and hydrogen gas is most preferred. When a heavy element is used, a nuclear reaction occurs due to collision with electrons, thereby producing a radioactive substance. Also, the electron beam is heated due to resonant absorption of electron energy. Therefore, such a heavy element cannot be used in the present invention. However, when no nuclear reaction is caused by an electron energy equal to or less than 8 MeV, such a heavy element can be used. The above-described effect becomes remarkable when the pressure of the gas becomes equal to or higher than $10^{-7}$ Torr. However, when the pressure of the gas becomes equal to or higher than $10^{-3}$ Torr, the loss of the beams becomes considerable. Since the loss of the beam depends on the RF acceleration power, the amount of accumulated current can be increased by increasing the input power so as to generate radiation having a higher intensity.

The action of the gas introduced into the beam duct of the electron storage ring is as follows.

(1) Since ions produced by an electron beam stay on the electron orbit, an ion channel is formed, and the channel strongly focuses the electron beam. In a magnetic field, ions exhibit a cyclotron motion having a radius of about a few millimeters in a plane perpendicular to the magnetic field, and they drift in the direction of the magnetic field at a slow speed compared to the circulating time of the electron beam, which is about $10^{-7}$ sec/mm. Accordingly, the ions are repeatedly attracted by the electron beam, so that they stay on the electron orbit for a prolonged period of time. On the other hand, electrons drift at a faster speed and are repulsed by the electron beam. Accordingly, electrons deviate from the electron orbit.

(2) The generated ions decrease the Coulomb force between electrons in the electron beam, thereby preventing the loss of the electron beam caused by Coulomb repulsion. This weakens the wake field to eliminate the instability of the beam, thereby making it possible to accumulate a large current.

(3) A bremsstrahlung occurs due to scattering of electrons and ions. The bremsstrahlung is a source of high-intensity x-rays. The strength of the bremsstrahlung is proportional to the electron energy. The spectrum is inversely proportional to the energy of the radiation when measured in a state in which the bandwidth is maintained constant.

(4) The higher the energy of electrons, the larger is the energy loss produced due to the bremsstrahlung. Accordingly, cooling of the beam by radiation and the damping effect can be obtained. As a result, the electron beam can be stabilized. In addition to increasing the amount of storage of current and focusing the beam, ions provide a damping effect which supplements synchrotron radiation, thereby stabilizing the laser beam generation of an insertion-type free-electron laser or a photon storage ring and increasing the output thereof.

(5) Since instability of the beam is suppressed by the presence of ions and radiation cooling is performed by the bremsstrahlung, the synchrotron frequency is increased, so that the bunch length is shortened, thereby increasing the amount of coherent synchrotron radiation.

Although the introduction of a gas causes a loss of the beam due to scattering with nuclei and a bremsstrahlung of high energy, most of the energy loss is an energy loss caused by electromagnetic scattering, which is equal to or less than a few hundreds KeV. Therefore, such an energy loss does not shorten the life of the beam. In an electron storage ring of a low energy type, Coulomb scattering among electrons shortens the life of the beam. This, however, is mitigated by the presence of ions as described above, so that the life of the beam is extended. To obtain high-intensity x-rays, coherent synchrotron radiation, or a laser beam by using a compact electron storage ring, a large current must be accumulated in the electron storage ring. This can be achieved by (1) maintaining the life of the electron beam at an optimum value, and (2) continuously injecting an electron beam from an external injector. To continuously inject an electron beam from the outside and prevent the center orbit of electrons from deviating, a resonance injection method is utilized.

When an optical resonator is disposed at the circumference of a completely circular electron storage ring so as to be concentric with the circle of the electron beam, generated synchrotron radiation, coherent synchrotron radiation, and a bremsstrahlung can be accumulated in the optical resonator, thereby performing laser beam generation of a photon storage ring-type free-electron laser. When hydrogen gas is charged into such an electron storage ring, the electron beam can be stabilized, a large current can be accumulated, and the bunch length can be shortened. Alternatively, the electron beam can be cooled to stabilize the laser output and to obtain an increased output.

When an optical resonator is disposed in the electron storage ring, the output mainly contains millimeter waves, submillimeter waves, far infrared rays, infrared rays, visible light, and ultraviolet rays. Also, its output is taken out of a single port.

According to the present invention, high-intensity x-rays can be generated by using a compact electron storage ring of about 50 MeV.

A thin film or a wire is inserted, as a target, into an electron storage ring to generate high-intensity x-rays. In this case, x-rays are generated from the location where the target is present, which is convenient for use. However, the target has neither a beam focusing effect nor a damping effect.

Since a bremsstrahlung is generated by utilizing a Coulomb electric field formed by nuclei, it is easy to generate high energy x-rays compared to a synchrotron radiation mechanism. Further, since the radiation angle is determined by kinematics as in synchrotron radiation, the radiation angle becomes $1/\gamma$. The difference between the electron storage ring of the present invention and a strong x-ray source such as a rotary twin-cathode type is that a thin film is used as a target. As a result, electrons which have passed through the target are repeatedly utilized to supply energy in an RF acceleration cavity of the ring, thereby recovering the energy loss due to the bremsstrahlung. Therefore, the efficiency of the ring is quite high. Since the target is thin, x-rays are not absorbed by the target and can be used entirely.

The spectrum of the bremsstrahlung has no critical wavelength as in synchrotron radiation, and is constant from the ultraviolet range up to electron energy. When an electron storage ring of 50 MeV is used, the output becomes $10^{13}$ photon/sec, mrad$^2$, mm$^2$ as measured as brilliance (bandwidth: 0.1%) in the ranges of ultraviolet rays, soft x-rays, and hard x-rays. The output is greater than the output of a superconductive synchrotron radiation source (electron energy: 0.6 GeV). A plurality of targets may be inserted into the electron storage ring. However, since the total number of photons is determined by the power of the injector and the RF power of the ring, the number of photons is divided by the number of ports. Further, the generation of x-rays can be started and stopped by inserting and withdrawing the thin film. This is an important feature of the ring of the present invention which is not provided by a synchrotron radiation apparatus.

DESCRIPTION OF THE PREFERRED EMBODIMENTS

Embodiments of the present invention will now be described with reference to the accompanying drawings.

Figure 1:
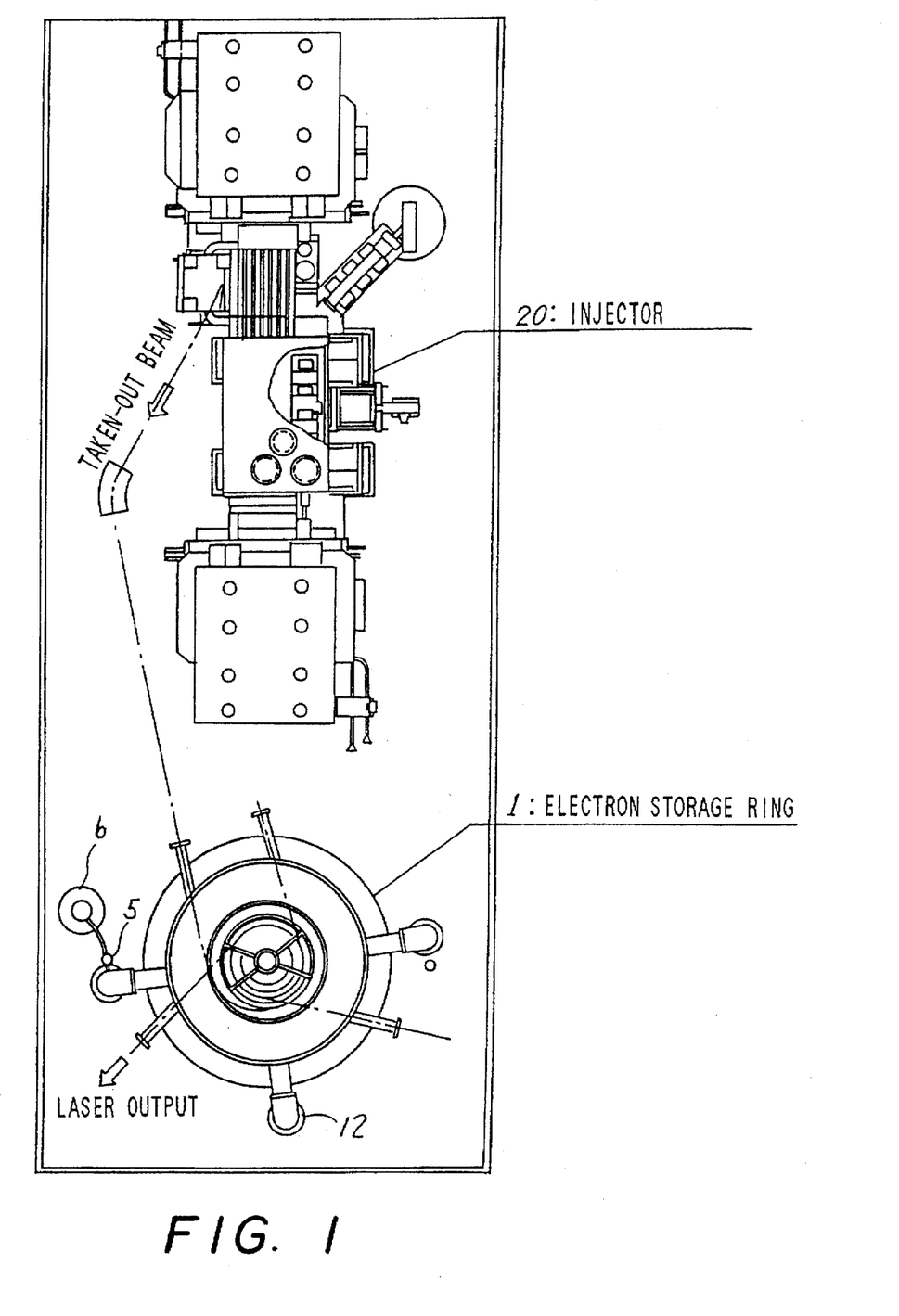
FIG. 1 is a structural view of a gas charged type electron storage ring system showing an embodiment of the present invention.
Figure 2:
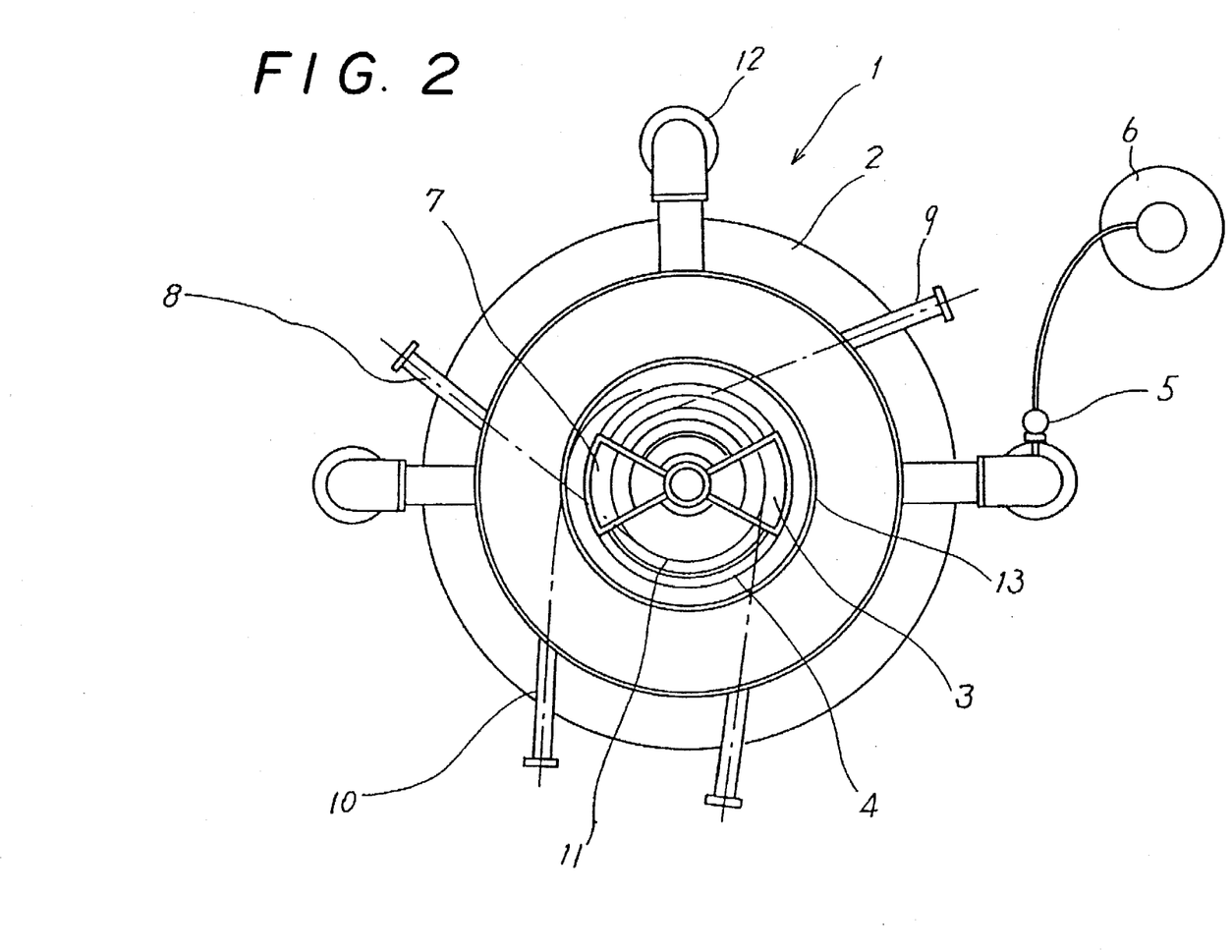
FIG. 2 is a view showing the structure of a gas charged type electron storage ring of the system shown in FIG. 1.

As shown in FIG. 1, a gas charged type electron storage ring system according to the present invention comprises an electron storage ring 1, and an injector 20. Although various electron storage rings the shape of which varies depending on the layout of magnets can be used as the electron storage ring 1, a completely cylindrical electron storage ring shown in FIG. 2 is used in the present embodiment. The electron storage ring 1 comprises a magnet 2, an acceleration cavity 3, and a beam duct 4 as main components. Electrons pass through an injection orbit 10 and are then accumulated on a storage orbit 11. Numeral 7 denotes a perturbator, numeral 8 denotes a light take-out port, numeral 9 denotes a radiation take-out port, numeral 12 denotes a duct connected to a vacuum pump, and numeral 13 denotes an optical resonator for a photon storage ring-type free-electron laser.

Although a LINAC, synchrotron, or microtron can be used as the injector 20 shown in FIG. 1, a microtron of a race track type is used as the injector 20 in the present embodiment. Since the resonance injection method is used to inject electrons into the electron storage ring 1, the perturbator 7 is used.

To shorten the bunch of an electron beam in the electron storage ring 1 as much as possible, it is essential to lower the electron energy, shorten the damping time by using a strong magnetic field and use a high acceleration frequency. For example, when the electron energy is 50 MeV, the radius of the orbit is 15 cm, the n value is 0.01 and the RF frequency is 2.54 GHz, the bunch length becomes about 0.3 mm. The pulse width of light becomes 1 ps. However, it is to be noted that the bunch length becomes a few mm due to intrabeam scattering when the current is large The beam duct 4 in the electron storage ring is usually maintained in an highly evacuated state having a pressure equal to or less than $10^{-10}$ Torr so as to prevent a circulating electron beam from attenuating due to scattering with gas. In contrast, the feature of the gas charged type electron storage ring according to the present invention is the provision of means 6 which introduces a gas into the beam duct 4 via a gas valve 5. The gas introducing means 6 is provided with means for adjusting the pressure of the gas to set the pressure of the gas to be equal to or greater than $10^{-9}$ Torr.

Hydrogen gas is used as the gas. In this case, the amount of impurities contained therein is preferably decreased such that the partial pressure thereof becomes equal to or less than $10^{-9}$ Torr. Such impurities will become a cause of residual radioactivity.

The introduction of hydrogen gas into the electron storage ring 1 causes attenuation of the electron beam due to scattering. On the other hand, the introduction of hydrogen gas strongly focuses the electron beam, thereby stabilizing it. Also, many high-intensity x-rays are generated by a bremsstrahlung.

It has been considered that the above-described method is not practical due to the attenuation of the electron beam. In the present invention, such attenuation is compensated by injecting an electron beam at a speed greater than a speed corresponding to the speed of the attenuation. This compensation is part of the present invention. The method for continuously injecting an electron beam into the electron storage ring 1 is a resonance injection method. For this purpose, the perturbator 7 is inserted into the electron orbit. The perturbator 7 is an air-core coil, and generates a non-linear magnetic field in the radius vector direction. Also, it has no gradient on the center electron orbit. The feature of the resonance injection method is that it does not displace electrons on the center orbit. Accordingly, it is possible to accumulate a large current without preventing emission of coherent synchrotron radiation and synchrotron radiation, generation of high-intensity x-rays, laser oscillation of an insertion-type free-electron laser or a photon storage ring.

To maximize the output of x-rays, the laser output, or the output of coherent synchrotron radiation or synchrotron radiation, mean is provided to optimally adjust the pressure of the gas, thereby maintaining the life of the beam at an optimal length.

Although it has been a general knowledge that the life of a beam decreases when a gas is introduced into the electron storage ring, it has been found that the introduction of a gas provides a strong action of focusing the beam, and extension of the life when the pressure of the gas is proper.

Figure 3:
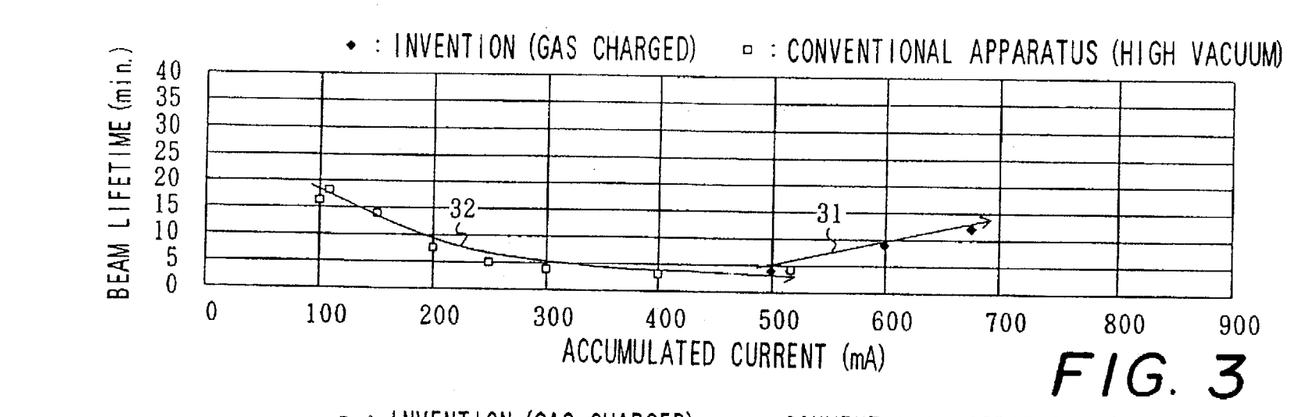
FIG. 3 is a graph showing the relationship between beam current and the lifetime of the beam in a state in which hydrogen gas is charged into the electron storage ring.

FIG. 3 shows the relationship between the lifetime of the beam (minute) and the storage (or accumulated) current (mA) in a state in which $H_2$ gas of about $1 \times 10^{-7}$ Torr is introduced into a completely circular electron storage ring having an electron energy of 150 MeV and an orbit radius of 0.5 m. Generally, the life of the beam is long when the storage current is slight, and becomes shorter as the accumulated current increases (see the decreasing line 32 in FIG. 3). Although FIG. 3 shows the above-described tendency which occurs when the storage current is slight, the life of the beam increases when the storage current further increases. The life increases when the accumulated current exceeds 500 mA in the case where $H_2$ is introduced (see the increasing line 31 in FIG. 3).

The size of an electron beam in the electron storage ring, i.e., the cross-sectional shape and the bunch length (the electron beam circulates while forming a cluster) is restricted by the focusing action of the magnet and the RF acceleration voltage, and cannot be increased over a predetermined size. Hence, when the storage current increases, the size of the beam tends to increase due to Coulomb repulsing force which mutually acts on electrons in the bunch, and slightly increases in an actual case when the energy of electrons is low. However, the beam becomes instable when the amount of current exceeds a predetermined limit. Accordingly, it is difficult to accumulate a current over a predetermined level (see the line 34 in FIG. 4).

Figure 4:
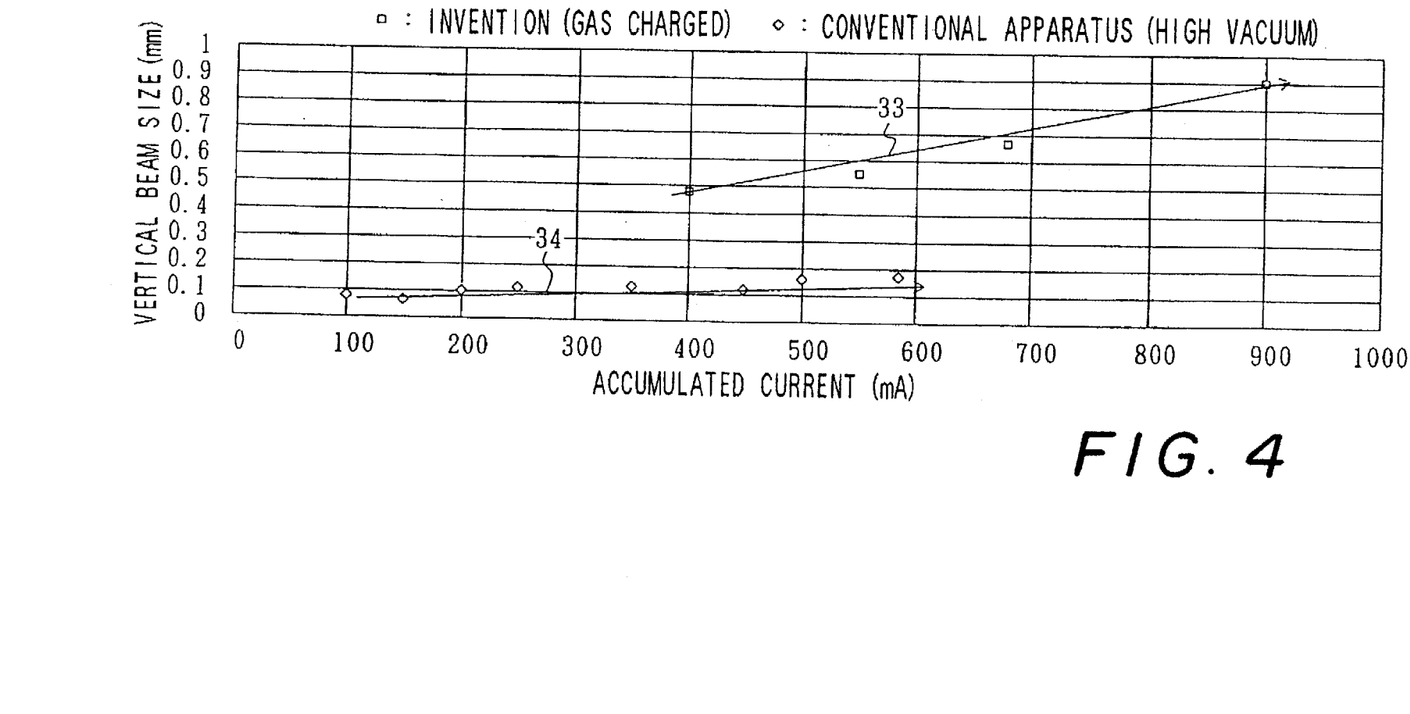
FIG. 4 is a graph showing the relationship between the beam current and the beam size in the vertical direction in a state in which hydrogen gas is charged into the electron storage ring.
Figure 5:
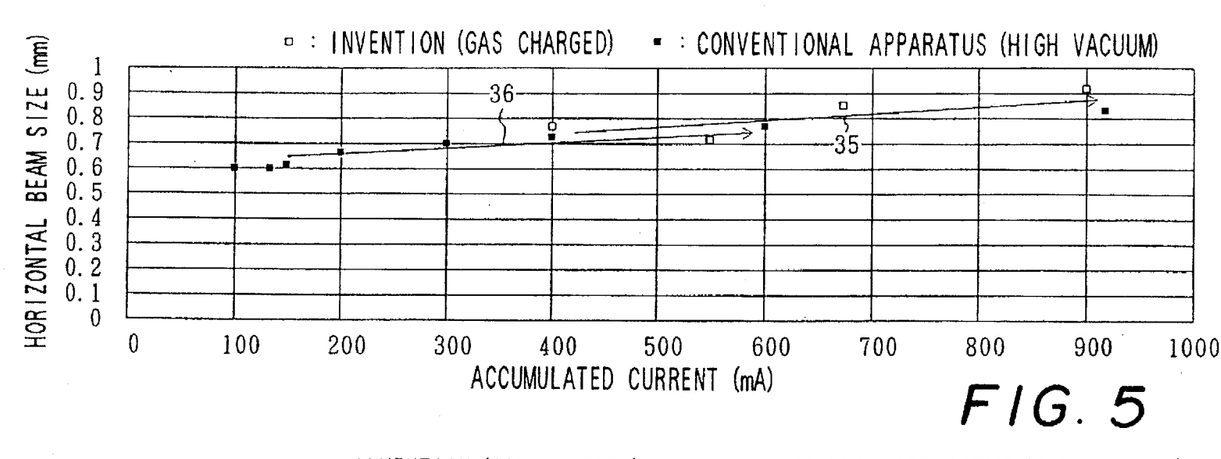
FIG. 5 is a graph showing the relationship between the beam current and the beam size in the horizontal direction in a state in which hydrogen gas is charged into the electron storage ring.
Figure 6:
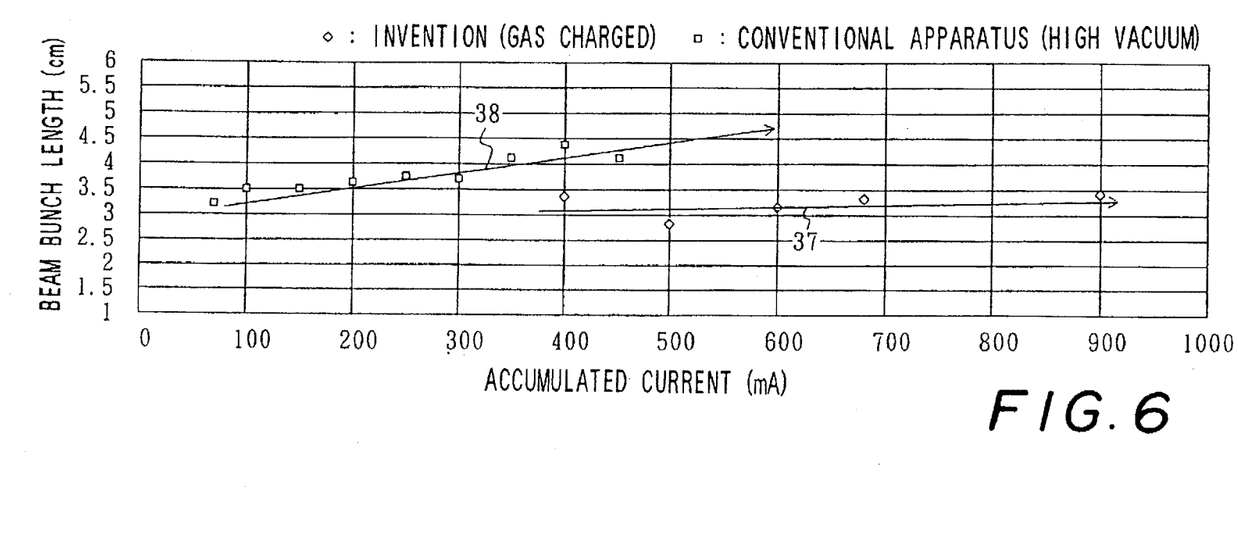
FIG. 6 is a graph showing the relationship between the beam current and the bunch length of the beam in a state in which hydrogen gas is charged into the electron storage ring.

In contrast, when a gas is introduced, the diameter of the beam increases in the vertical direction as the current increases, as shown in FIG. 4 (see the increasing line 33 in FIG. 4). However, the diameter of the beam does not exceed a predetermined level in the horizontal direction (see the lines 35 and 36 in FIG. 5). Especially, it is possible to accumulate a large current even if the bunch length does not change as shown in FIG. 6 (see the line 37 in FIG. 6). In contrast, when $H_2$ gas is not introduced, the bunch length increases as the current increases (see the line 38 in FIG. 6). When $H_2$ gas was introduced, the maximum storage current reached 1 A.

The above-described results are caused by the introduction of $H_2$ gas into the electron storage ring. The reason why such a phenomenon occurs is considered that $H_2$ gas is strongly ionized along the electron orbit, so that the potential created by the ions strongly confines subsequent electrons within the beam orbit. In other words, an ion channel is formed. Ions exhibit a cyclotron motion having a radius of about 1 mm in a magnetic field, are confined in a plane perpendicular to the magnetic field, and they slowly drift along the magnetic field.

Moreover, a bremsstrahlung occurs due to the introduction of a gas. Radiation having a higher energy is generated for electrons having a higher energy. Hence, like the generation of synchrotron radiation, damping and radiation cooling action are provided for the electron beam (cooling means that the energy spread of the electron beam becomes smaller). The reason why the bunch length becomes short is considered that the instability of the beam is eliminated due to the presence of ions, or the synchrotron frequency increases due to the damping and radiation cooling action, and the focusing action of the ions.

The reason why hydrogen gas is suitable as a charging gas is that hydrogen causes no nuclear reaction due to collision with electrons, because hydrogen does not have a nuclear structure. If a nuclear reaction occurs, the electron energy drastically decreases, so that the life of the electron beam is shortened considerably. In addition, since the nuclear reaction resonantly occurs, the attenuation of the energy is discrete and does not depend on the electron energy. Accordingly, heat is generated.

In the above-described embodiment, the storage current reached 1 A when using electrons of 150 MeV. This corresponds to 10 A in a supper compact electron storage ring having an orbit radius of 0.15 m and an electron energy of 50 MeV. In a compact electron storage ring, the bunch length becomes 0.3 mm. Accordingly, the wavelength of coherent synchrotron radiation is from a few hundreds µm to a few tens µm. The outer diameter of the magnet of a completely circular electron storage ring becomes 1 m. Accordingly, the gas charged type electron storage ring of the present invention is a unique as a super compact apparatus for generating far infrared red rays of a picosecond pulse. Also, the present invention provides an effective method for generating x-rays of a femtosecond pulse.

Figure 7:
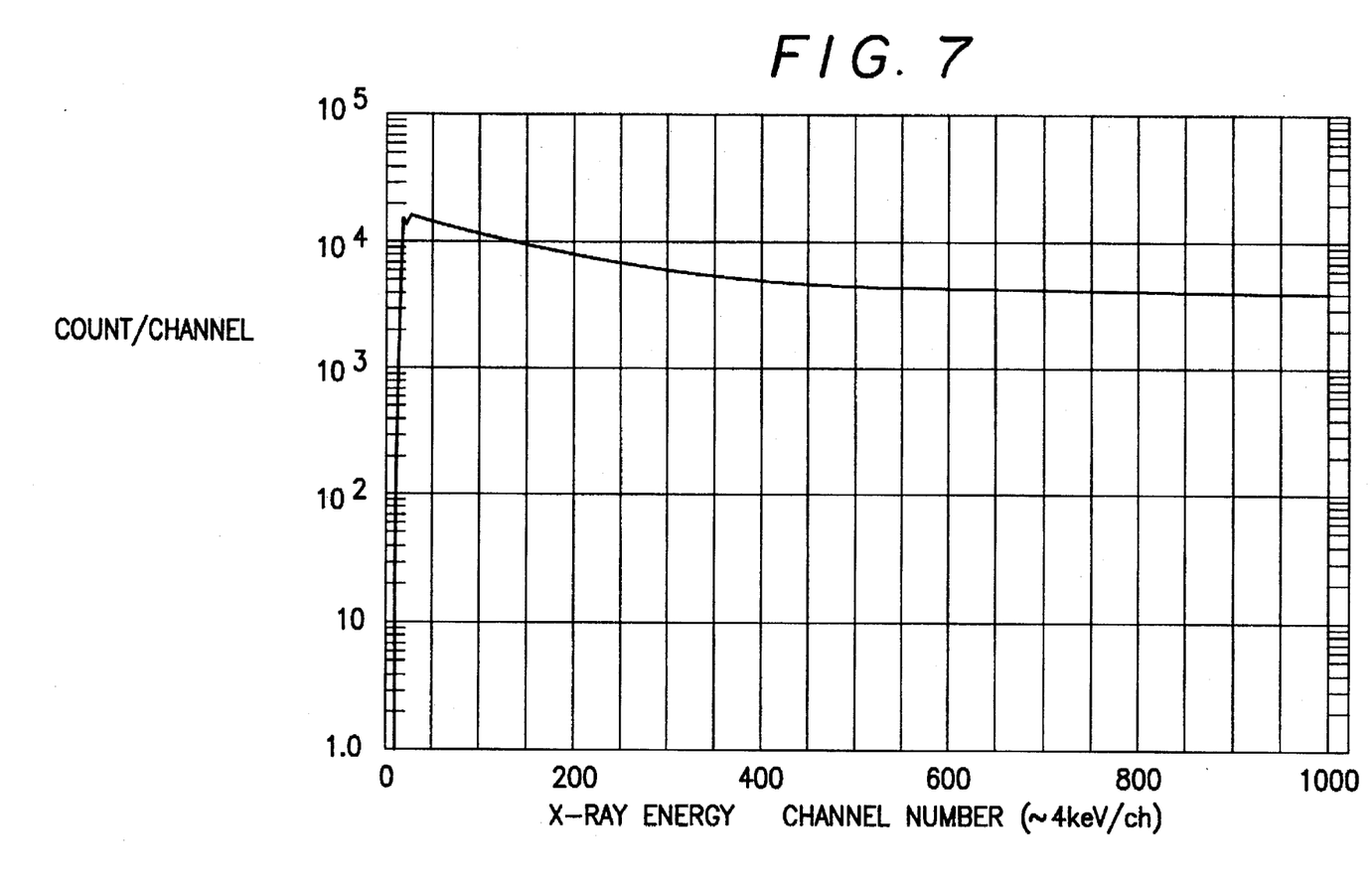
FIG. 7 shows an example of detected high energy x-rays which are generated by a bremsstrahlung in a state in which hydrogen gas is charged into the electron storage ring.

FIG. 7 shows an example of detected high energy x-rays due to a bremsstrahlung in a state in which hydrogen gas is charged. In FIG. 7, the abscissa represents the x-ray energy (keV) and the ordinate represents the count value.

The spectrum is detected by using an NaI detector of 2×2 inches, and covers from about 100 keV to 4 MeV. Although the detection efficiency becomes equal to or less than 6% when the electron energy is equal to or higher than 1 MeV, the spectrum shown in FIG. 7 has not been compensated. Data were obtained by performing a measurement for 300 seconds in a state in which the electron energy was 150 MeV, the storage current was 1–200 mA, and the gas pressure was $5 \times 10^{-7}$ Torr. The spectrum includes Compton scattering of high energy γ rays. x-rays not greater than 100 keV are cut, because the count value becomes too large and the dead time of an ADC becomes too large. The strength of the spectrum well matches with its theoretical value, and a practical amount of x-rays can be obtained even at the above-mentioned gas pressure when the energy is low.

Next, another embodiment of the present invention will be described.

In an apparatus according to the present embodiment, a compact electron storage ring which is used in a photon storage ring is used. A thin film or wire of a few micrometers is inserted, as a target, into the orbit of the electron storage ring to generate a bremsstrahlung. Since the bremsstrahlung is generated by utilizing a Coulomb electric field formed by nuclei, it is easy to generate high energy x-rays compared to a synchrotron radiation mechanism. Further, since the radiation angle is determined by kinematics as in the synchrotron radiation, the radiation angle becomes $1/\gamma$. The difference between the electron storage ring of the present invention and a strong x-ray source such as a rotary twin-cathode type is that a thin film is used as a target. As a result, electrons which have passed through the target are repeatedly utilized to supply energy in an RF acceleration cavity of the ring, thereby recovering the energy loss due to the bremsstrahlung. Therefore, the efficiency of the ring is quite high. Since the target is thin, x-rays are not absorbed by the target and can be used entirely.

The spectrum of the bremsstrahlung has no critical wavelength as in synchrotron radiation, and is constant from the ultraviolet range up to electron energy. When an electron storage ring of 50 MeV is used, the output becomes $10^{13}$ photon/sec, mrad$^2$ mm$^2$ as measured as brilliance (bandwidth: 0.1%) in the ranges of ultraviolet rays, soft x-rays, and hard x-rays. The output is greater than the output of a superconductive synchrotron radiation source (electron energy: 0.6 GeV). A plurality of targets may be inserted into the electron storage ring. However, since the total number of photons is determined by the power of the injector and the high frequency power of the ring, the number of photons is divided by the number of ports. Further, the generation of x-rays can be started and stopped by inserting and withdrawing the thin film. This is an important feature of the ring of the present invention which greatly differs from a synchrotron radiation apparatus.

The structure of the electron storage ring mainly used to generate x-rays will now be described.

(A) Super Compact Electron Storage Ring

The requirements of such an electron storage ring are high injection efficiency, capability of increasing the speed of repetition of injection, capability of continuously injecting an electron beam by accumulated energy, a large momentum aperture, etc. Various types of rings such as a race track type, and a completely circular type can be used. The present invention can be applied to a ring which is presently used. The electron energy can be selected from the range from a few tens MeV to a few hundreds MeV. Since the radiation angle depends on $1/\gamma$, the intensity of x-ray beam increases as the energy increases. However, the size of the accelerator necessarily increases, and the load of an injector also increases. Moreover, useless high energy γ rays are generated, and it will become a cause of generating neutrons due to a (γ, n) nuclear reaction. Accordingly, it is recommended to decrease the energy as much as possible. Needless to say, the electron energy must be determined based on the brilliance of desired x-rays, and neutrons can be shielded. When the electron energy is too low, attenuation of the electron beam occurs due to elastic scattering with nuclear particles for the yield of a bremsstrahlung, and the damping time becomes longer. Accordingly, it is generally considered that the electron energy cannot be lowered too much.

When such an apparatus is commercialized for x-ray lithography or angiography, use of an electron storage ring of about 50 MeV is proper. Since $1/\gamma$ is about 10 mrad, its irradiation field becomes about 100 mm at a position 10 m away from the ring, thereby making it possible to increase the photographing field. The reason why a completely circular ring is selected is that a resonance injection method can be used which does not affect electrons on the center orbit when electrons are injected. As a result, the light source point does not move upon injection. This has sufficiently been proved by AURORA. Also, it is to be noted that the energy is optimum for a photon storage ring.

Figure 8:
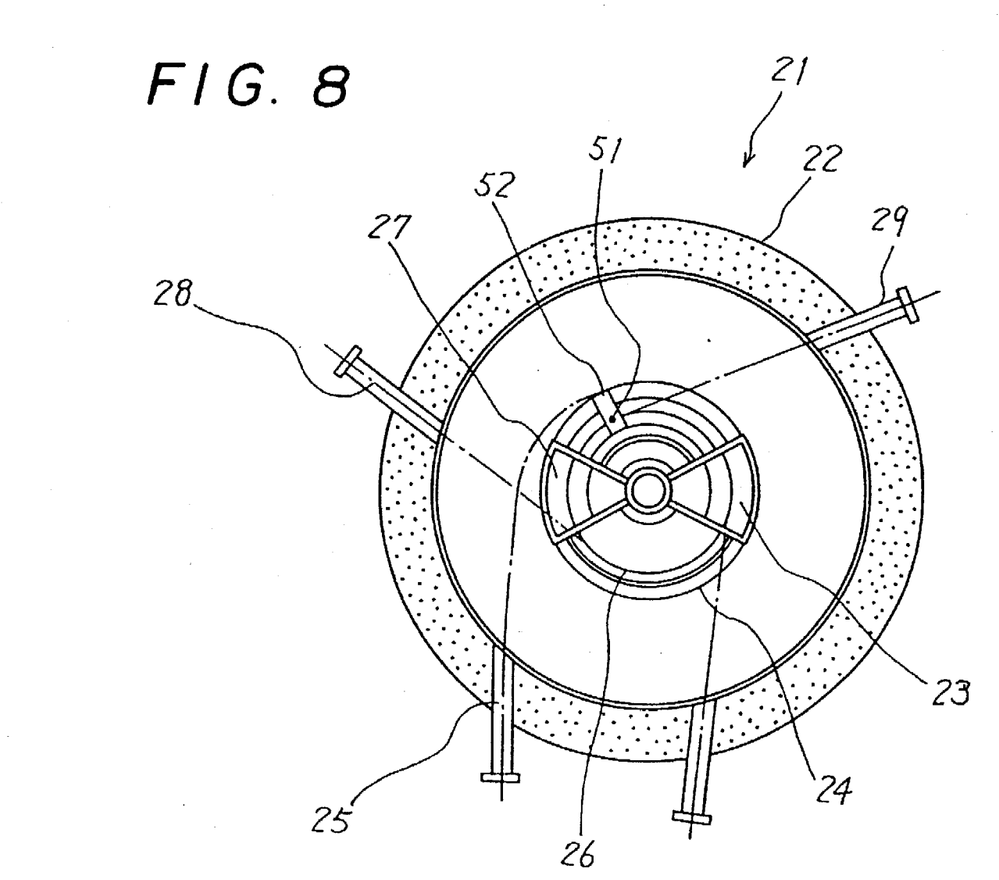
FIG. 8 is a structural view of a super compact electron storage ring showing another embodiment of the present invention.

FIG. 8 is a sectional view of a completely circular super compact electron storage ring for generation of x-rays, which shows another embodiment of the present invention.

In FIG. 8, numeral 21 denotes a completely circular super compact electron storage ring. The electron storage ring 21 includes a cylindrical magnet 22, an acceleration cavity 23, a beam duct 24, an injection orbit 25, a storage orbit 26, a perturbator 27, a light take-out port 28, and a radiation take-out port 29. The electron energy is 50 MeV, the orbit radius is 155.8 mm, and the acceleration frequency is 2.45 GHz. A cylindrical normal-conducting magnet is arranged such that the strength of the magnetic field becomes 1.1 T, and the n$^-$ value of the magnetic field becomes 0.7. Electrons are injected into the electron storage ring by a resonance injection method which was actually used in a superconductive synchrotron radiation apparatus "AURORA". In the present embodiment, ⅔ resonance injection is utilized.

The apparatus according to the present invention is further provided with a target 51.

When a wire made of tungsten and having a diameter of about 10 μm or a thin film made of carbon and having a thickness of a few tens μm is inserted, as the target 51, into the electron orbit, the efficiency in generating x-rays can be increased. Especially, the present embodiment is suitable to the case where x-rays are taken out from a specific port only. As in the case of using a gas, it is important to accumulate a large current. For this purposes, the life of the beam must be maintained at a proper length. This can be accomplished by adjusting the number of wires or thin films.

The parameters of the electron storage ring are shown in Table 1.

TABLE 1

| | |
|---|---|
| n$^-$ value | 0.7 |
| Emittance [πmrad] | 9.00E–07 |
| Energy spread [ΔE/E] | 2.00E–03 |
| Horizontal beam size [mm] | 1.2 |
| Vertical beam size [mm] | 0.04 |
| Bunch size [mm] | 9 |
| Horizontal damping rate [/sec] | 50 |
| Tousheck life at 1A [/sec] | 150 |

As shown in Table 1, the n$^-$ value is 0.7, the emittance is 9.00E–0.7 (πmrad), the energy spread is 2.00E–03 (ΔE/E), the horizontal beam size is 1.2 (mm), the vertical beam size is 0.44 (mm), the bunch size is 9 (mm), the horizontal damping rate is 50/sec, and the Tousheck life at 1 A is 150/sec.

In the x-ray generating apparatus of the present embodiment, a large n⁻ value of about 0.7 is used to increase the acceptance, thereby enhancing the action of converting the beam.

Also, a super high vacuum state is not necessary to create. In ordinary synchrotron radiation sources, a super high vacuum state of $10^{-10}$ Torr is created to extend the life of a beam. The Tousheck life of a 50 MeV electron storage ring is a few minutes at most, and the life is further shortened to a few milliseconds by inserting a thin film. Accordingly, a vacuum of $10^{-7}$ Torr is sufficient.

(B) Injecting Apparatus

An injecting apparatus is composed of an injector 20 such as a microtron or linac, and a perturbator 27 for forming an injection orbit in the electron storage ring. For a completely cylindrical ring AURORA, a magnetic channel and an inflator are further utilized to compensate the flinging field of the cylindrical magnet 22, thereby increasing the efficiency in beam transfer. In a new ring, the transfer efficiency can be increased, without a magnetic channel, by using a field clamp. Accordingly, the number of injecting apparatuses can greatly be decreased, and the reliability of the apparatus can be increased.

The larger the power of the injector, the larger is the x-ray output obtained. As will be described later, it is expected that the x-ray output becomes $10^{10}$/s, mrad, 0.1% bandwidth when the apparatus is operated in a state in which the peak current is 10 A and the repetition frequency is 50 Hz. When an electron beam is injected, the electrons are captured for a period of 0.1 µs in which the perturbator is driven. Accordingly, it is sufficient for the macropulse of the injector to continue for 0.1 µs. A prebuncher is preferably used to reduce the load of the injector. When a linac is used as the injector, the beam load can be decreased to about 250 W.

(C) Strength of Bremsstrahlung

As have been already described, the mechanism for generating hard x-rays using a compact electron storage ring is not a synchrotron radiation mechanism, but a mechanism utilizing a bremsstrahlung generated from a thin film or a fine wire which is placed, as a target, on the electron orbit. Unlike an ordinary strong x-ray source, the electron beam is repeatedly utilized by using an electron storage ring. The energy of the bremsstrahlung is injected from the injector 20, and the loss of the energy is compensated at the acceleration chamber 23. The use of the thin film as a target is important, because it does not absorb generated x-rays. Further, since the electron energy is relativistic, the radiation spread of the bremsstrahlung is focused in front of the electron beam, like in the synchrotron radiation. The radiation spread becomes about $1/\gamma$. Moreover, since the effective size of a light source becomes equal to the size of the target, so that the size of the light source can be made smaller than the size of the electron beam.

The strength of the bremsstrahlung is calculated as follows. First, an amount of attenuation of an electron beam when the target is inserted into the electron orbit, and an average current is obtained. Subsequently, it is integrated to obtain a bremsstrahlung spectrum generated by each electron. As to the bremsstrahlung spectrum, Bethe, Heitler and Shiff quantum-mechanically calculated the angle and the wavelength distribution, and also performed compensation of the effect of shield of an electric field by electrons in the 1940s.

(D) Accumulated Current

In an ordinary synchrotron radiation ring, the saturated accumulated current of an electron storage ring is determined by the injection speed, and the beam loss due to Tousheck scattering in the case of a high vacuum. Tousheck scattering is a phenomenon in which electrons cause Coulomb scattering of a large angle each other in a bunch and deviate from the orbit. Accordingly, this phenomenon becomes considerable when the energy is low and the current is large. However, the beam loss in such an apparatus is mainly determined by elastic scattering and inelastic scattering due to the target.

The accumulated current (I) at the time of injection is given as follows:

$$dI/dt = \text{Injection rate} \times \text{Efficiency} \times I_0 \times \delta t \times \omega_{RF} - \mu I - \eta I^2 \qquad (1)$$

The first term of the right side is the amount obtained by multiplying the number of injected electrons per unit time by the circulating frequency of the ring. The number of injected electrons is determined by the injection rate, the injection efficiency, the peak current $I_0$ of the injector, and the period $\delta_t$ during which the perturbator receives electrons. The effective injection current is obtained by multiplying the number of electrons by the circulating frequency of the ring. $\mu$ is the degree of attenuation due to scattering with gas and a target, $\eta$ is the degree of attenuation due to Tousheck scattering.

The attenuation amount $\mu$ is the degree of attenuation determined by the inelastic scattering and the elastic scattering due to the target, and depends on the number of atoms of the target and the thickness thereof but does not depend on the current value. Although the inelastic scattering is mainly a bremsstrahlung, loss is produced by ionization. In the case of a thin film, loss is also produced due to transition radiation. Since the loss due to ionization is very small, only the bremsstrahlung is considered hereinbelow. Since the strength of the transition radiation is comparable to the bremsstrahlung, and the energy becomes about 5 keV when the energy of electrons is 50 MeV, the transition radiation must be considered. However, it is judged that the transition radiation does not decrease the strength of x-rays but increases the strength, and does not attenuate the beam so much as the bremsstrahlung. Accordingly, the transition radiation will be omitted from the consideration.

The beam loss due to scattering with gas and the target can be obtained as follows. Inelastic scattering, which is a bremsstrahlung, attenuates the energy of electrons. When the amount of this attenuation exceeds a momentum half aperture $(\Delta p/p)_{max}$ of the electron storage ring, which is determined by the acceleration voltage, the electron beam is lost. The cross-sectional area of such an attenuation can be expressed as follows:

$$\Psi_{Br} = \frac{4Z^2 r_e^2}{137} \cdot \frac{4}{3} \left[ \ln\left(\frac{183}{Z^{1/3}}\right) \right] \left\{ \ln\left[\frac{1}{(\Delta p/p)_{max}}\right] - \frac{5}{8} \right\}, \qquad (2)$$

where Z is the atomic number of the target, and $r_e$ is the classical electron radius. The momentum half aperture is an amount which is determined based on the acceleration voltage, and also depends on the focusing force of the magnetic field. Assuming that the electron storage ring is a completely circular ring, and the acceleration voltage is 100 keV, $(\Delta p/p)_{max}$ is expected to be about 0.06. That is, electrons are caught by an RF bucket even when the electron energy deviates from the central electron energy of 50 MeV by ±3 MeV.

The electron beam is also lost in the case where the amplitude of betatron oscillation exceeds the dynamic aperture of the ring or the aperture of the beam duct when electrons undergo scattering of a large angle due to elastic scattering with nuclei. The cross-sectional area at that time is given by the following equation:

$$\Psi_{el} = \frac{2\pi r_e^2 Z^2}{\gamma^2} \times \frac{<\beta>}{Ac}, \quad (3)$$

where $<\beta>$ is a betatron amplitude at a location where the amplitude in the horizontal or vertical direction becomes largest. The acceptance Ac is actually restricted by the radius b of the beam duct, and can be expressed as $Ac=b^2/\beta o$. In a completely circular ring, the betatron amplitude is constant at all positions. Therefore, $<\beta>$ is equal to $\beta o$. In a 50 MeV ring to be obtained, the radius b of the beam duct can be set to 30 mm. The dynamic aperture is far greater than this value. As is apparent from equations (2) and (3), the beam loss due to a bremsstrahlung does not depend on the electron energy, but the elastic scattering attenuates with attenuation of the electron energy in accordance with the function of $1/\gamma^2$. Therefore, since the ratio of the bremsstrahlung to the elastic scattering increases as the electron energy increases, it is preferred to increase the electron energy as much as possible.

The beam loss rate $\mu$ due to scattering with the target can be calculated from the scattering cross-sectional areas represented by equations (2) and (3), and is represented as follows:

$$\mu = \frac{1}{I} \frac{dI}{dt} = (\Psi_{el} + \Psi_{Br}) \times n_t \times \chi_t \times f_{RF}, \quad (4)$$

where $n_t$ is the density of the target, $\chi_t$ is the thickness of the target. The relationship between the beam loss rate $\mu$ and the beam life $\tau_o$ can be expressed as $\mu=(\tau_o)^{-1}$. When the beam loss rate of the 50 MeV electron storage ring is calculated, the beam loss rate becomes about 7600/sec for inelastic scattering and 26000/sec for elastic scattering when a carbon thin film having a thickness of 10 μm is used. Although the life of the beam is as short as 0.04 msec, it means that electrons circulate about $1\times10^4$ times per second in average. Accordingly, the electron beam is sufficiently and repeatedly utilized even though its life is short. The number of repeated use of the electron beam can further be increased by increasing the acceleration voltage.

Circulating of 10000 times corresponds to passage of electrons through a target of 100 mm thick. However, even when a beam from a linac is caused to hit a target of 100 mm thick, the same x-ray output cannot be obtained. Generated x-rays are absorbed within the target, and the radiation angle becomes larger due to multiple scattering. Also, it is impossible to increase its brilliance.

Since the saturated current is determined when the injection and the beam loss are balanced, it can be obtained by solving the equation dI/dt=0.

Table 2 shows an example of calculation for obtaining the strength of a bremsstrahlung when a compact electron storage ring (electron energy: 50 MeV, orbit radius: 150 mm, n⁻ value: 0.7, RMS beam size: 1.2×0.04 mm, bunch length: 9 mm) is used.

TABLE 2

| Material and shape of target | C-foil | C-wire | W-wire |
|---|---|---|---|
| Grain density of target [/m³] | 1.13E+29 | 1.13E+29 | 6.25E+28 |
| Atomic number | 6 | 6 | 74 |
| Thickness of target [m] | 1.00E-5 | 1.00E-5 | 1.00E-5 |
| Width of target [m] | — | 1.00E-5 | 1.00E-6 |
| Effective interaction area | 3.37E-09 | 7.94E-10 | 7.94E-11 |
| Photon number/turn, electron | 1.90E-07 | 1.90E-07 | 1.39E-05 |
| Total photon flux at 1 keV/A, 0.1% band | 1.19E+07 | 1.19E+12 | 8.69E+13 |

TABLE 2-continued

| Material and shape of target | C-foil | C-wire | W-wire |
|---|---|---|---|
| Photon flux at 1 keV/mrad, A, 0.1% band | 1.56E+11 | 1.56E+11 | 1.14E+13 |
| Total radiation energy/electron [eV] | 1.07E+03 | 1.07E+03 | 7.87E+04 |
| Effective interaction area/beam cross-sectional area | 1.00E+00 | 2.36E-01 | 2.65E-03 |
| Beam loss rate due to inelastic scattering [/sec] | 7.64E+03 | 1.80E+03 | 1.25E+03 |
| Beam loss rate due to elastic scattering [/sec] | 2.65E+03 | 6.26E+03 | 5.16E+03 |
| Injection rate (Hz) | 50.00 | 50.00 | 50.00 |
| Peak current (A) | 10.00 | 10.00 | 10.00 |
| Injection efficiency | 6.00E-08 | 6.00E-08 | 6.00E-08 |
| Saturated accumulated current (A) | 3.79E-01 | 1.43E+00 | 2.02E+00 |
| Max photon flux at 1 kev/mrad, A, 0.1% band | 5.91E+10 | 5.91E+10 | 6.13E+10 |
| Brilliance | 1.64E+10 | 6.19E+11 | 6.42E+12 |

As shown in Table 2, for each of carbon foil (C-foil), carbon wire (C-wire) and tungsten wire (W-wire) serving as a target, the followings are obtained: the grain density of target (/m³), an atomic number, the thickness of the target (m), the width of the target, the effective interaction area, the photon number (/turn, electron), the total photon flux (1 keV photon)/A, 0.1% band, the photon flux (1 keV photon)/mrad, A, 0.1% band, the total radiation energy/electron (eV), the effective interaction area/beam cross-sectional area, the beam loss rate due to inelastic scattering (/sec), the beam loss rate due to elastic scattering (/sec), the injection rate (Hz), the peak current (A), the injection efficiency, the saturated accumulated current (A), the photon flux (1 keV photon)/mrad, A, 0.1% band, and the brilliance.

From Table 2, it can be found that the accumulated current becomes about 0.379 A when a carbon foil of 10 μm is used in a state in which the peak current of the injector is 10 A and the injection rate is 50 Hz. When a carbon wire of 10 μm width is used instead of the carbon foil, the accumulated current becomes 0.143 A. When a tungsten wire is used instead of the carbon wire, a thin wire can be used because of high efficiency in generating the bremsstrahlung. Since use of a thin wire causes accumulation of a larger amount of current, a problem sometimes arises that a desired amount of current cannot be accumulated due to instability of the beam. Accordingly, it is preferred to use a target having a large number of atoms to reduce the amount of current.

Also, even when the thickness of the target or the number of atoms of the target is changed, the photon flux does not change if the power of the injector and the RF power of the storage ring are the same. When the width of the wire decreases, the brilliance increases.

(E) Bremsstrahlung Damping

The injection rate is determined by the damping speed of the electron storage ring. The damping is a speed at which betatron oscillation attenuates to 1/e after excitement. The resonance injection method is a method in which betatron oscillation is intentionally excited to inject an electron beam. The excitation of betatron oscillation is performed by the perturbator. When the perturbator is turned off, the beam size decreases due to radiation damping, and becomes the beam size shown in Table 1. The damping occurs due to synchrotron radiation, the degree of damping is determined by the electron energy, the orbit radius, and the acceleration voltage. The injection can be resumed when the beam size in the horizontal direction decreases to an extent such that it is not affected even if the perturbator is excited. The magnetic field of the perturbator is flat over about 5 mm at the center thereof. Since the damping speed of the 50 MeV electron storage ring is about 20 msec, the injection rate of 100 Hz sufficiently falls within an allowable range. However, the beam dynamics of an electron storage ring in which a thin film is inserted to produce a bremsstrahlung differs from that of the above-described electron storage ring. That is, it is expected that the bremsstrahlung itself has a strong damping action. The synchrotron radiation and the bremsstrahlung are both a stokastic process. When power is input to the acceleration cavity by an amount corresponding to power which is lost as a bremsstrahlung, it is expected that a radiation damping, which is greater than a radiation damping generated by an electron storage ring producing a higher energy than that of an ordinary 50 MeV ring, can be generated by a compact ring. In an apparatus of this type, the damping speed becomes a few milliseconds even in the 50 MeV ring, which damping speed corresponds to that of a ring of a GeV class. Accordingly, it is realistic to perform injection at 100 Hz.

(F) Brilliance

To calculate the brilliance of the electron storage ring, the angular distribution of the bremsstrahlung and the size of a light source must be considered. The size of the light source is smaller one of the size of the target and the size of the electron beam.

The angular distribution of the bremsstrahlung is sometimes considered to have a spread of $4\pi$ in an example of an x-ray tube. However, it is to be noted that the angular distribution becomes $1/\gamma$ when relativistic electrons are used, because the angular distribution is kinematically determined by scattering of electrons and atomic nuclei. In this regard, the bremsstrahlung is the same as synchrotron radiation. The difference from the synchrotron radiation is that the strength of the bremsstrahlung becomes zero in the direction of 0 degree, and reaches a peak at a position of about $1/(2\gamma)$. The bremsstrahlung also differs from synchrotron radiation in that it becomes sharper as the photon energy decreases. The angular distribution of synchrotron radiation becomes sharper as the energy of x-rays increases. In contrast, the bremsstrahlung discharges a larger amount of photon energy when electrons are subjected to a larger deflection. Therefore, the distribution becomes sharper when the photon energy is low and the deflection is small.

The brilliance of this apparatus can be expressed as follows using an equation representing the differentiated cross-sectional area of the bremsstrahlung:

$$\frac{dN_{Br}}{dk\Omega dS} = \frac{4Z(Z+1) r_e^2}{137} \frac{dk}{k} \frac{(I_{ef}/1.6 \times 10^{-19}) \times n_t \times \chi_t}{\chi_x \chi_y \pi \sigma_{Br}^2} \times$$

$$\int_0^{-\sigma_{Br}} \sin(\theta) d\theta \left\{ \frac{16\Theta^2 E_0^2}{(1+\Theta^2)^4} - \frac{(E_0+E)^2 E_0}{E(1+\Theta^2)^2} + \right.$$

$$\left. 2 \times \ln\left(\frac{E \times E_0}{k}\right) \left[ \frac{(E_0+E)^2 E_0}{E(1+\Theta^2)^2} - \frac{4\Theta^2 E_0^2}{(1+\Theta^2)^4} \right] \right\} \quad (5)$$

where $I_{ef}$ is an effective current hit to the target, $E_0$ is an initial electron energy, and E is the electron energy after discharging photons. $\chi_t$ is the thickness of the wire. The integration is performed to $\sigma_{Br}=1/\gamma$. A bandwidth of 0.1% used in synchrotron radiation is applied to the bandwidth of the photon for comparison with synchrotron radiation, and dk is set to 0.001 k.

The size of the light source is expressed using $\chi_x$ and $\chi_y$, the size is a smaller one of the size of the target and the size of the electron beam, as described above. When a tungsten wire is used as the target, for example, $\chi_x$ represents the size of the electron beam in the transverse direction, $\chi_y$ represents the width of the wire.

In the case where the wire is inserted into the electron orbit and the cross-sectional area of the target $\chi_x \times \chi_y$ is smaller than that of the electron beam Sb, equation (4) for calculating the current value requires a correction term. That is, a value obtained by multiplying equation (4) by $\chi_x \chi_y/Sb$ represents an actual beam loss. Accordingly, the beam loss $\mu$ decreases in proportion to $\chi_x \chi_y/Sb$, and the saturated accumulated current increases in reverse proportion thereto. In equation (5), an effective current value $I_{ef}$ is used. This value is obtained by multiplying $I_{ef}$ by $\chi_x \chi_y/Sb$. As a result, it is found that the total number of photons generated due to a bremsstrahlung in the electron storage ring does not depend on the cross-sectional area of the target. When the size of the target decreases, a larger amount of current is accumulated accordingly. On the contrary, when the size of the target increases, the amount of current becomes slight. The similar rule can be The similar rule can be applied to the atomic number and the thickness. However, when the atomic number is too small or when the target is so thin that the saturated current becomes excessively large, the Touscheck life becomes short or the beam becomes instable. Therefore, it is preferred to use a target having a certain thickness to overcome the above-mentioned problems.

Figure 9:
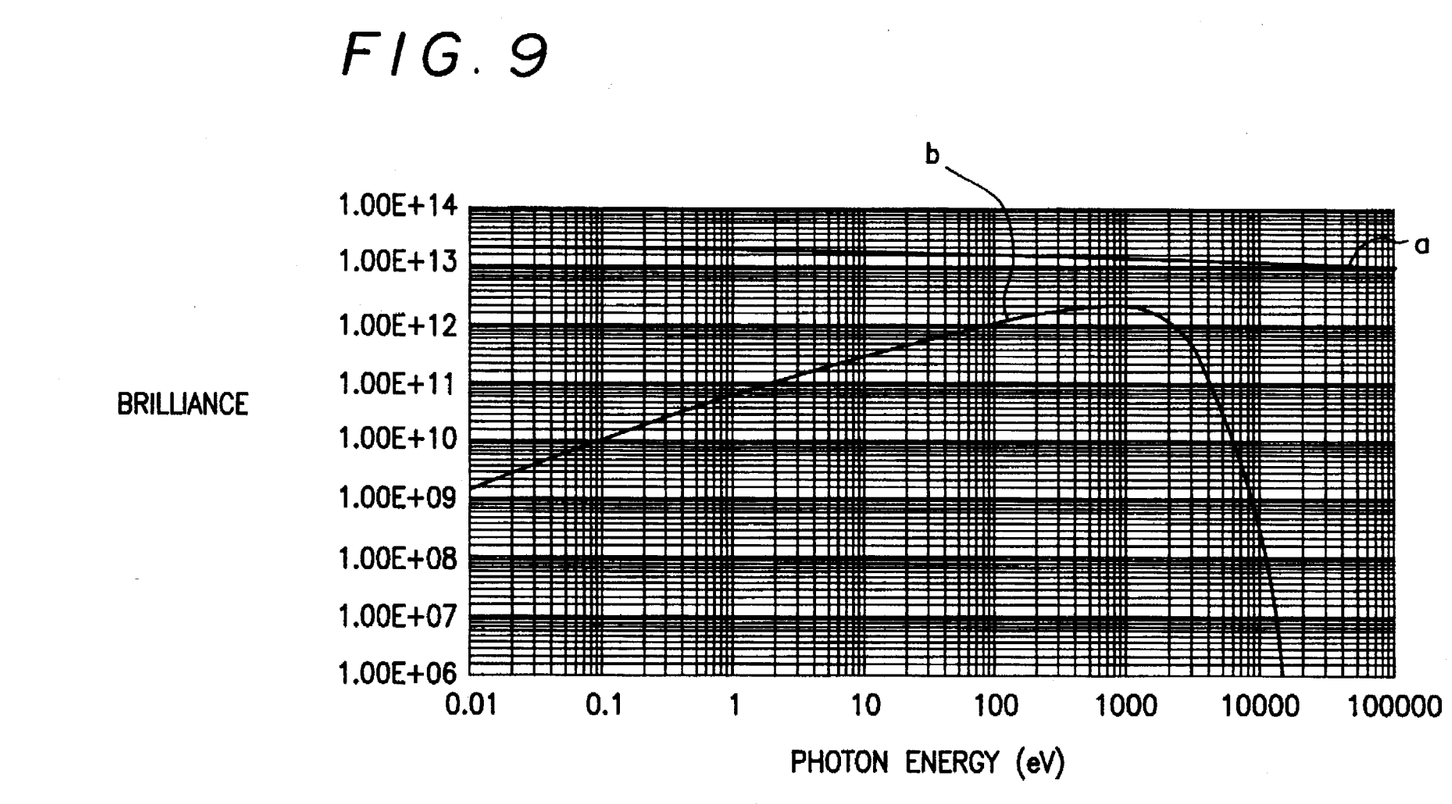
FIG. 9 is a view showing the brilliance of the super compact electron storage ring shown in FIG. 8 when a 50 MeV electron storage ring is used.

FIG. 9 shows the brilliance of the 50 MeV electron storage ring which was calculated in the above-described manner. The peak current of the injector is 50 A, and the injection rate is 100 Hz. In FIG. 9, the ordinate represents the brilliance while the abscissa represents the photon energy (eV). FIG. 9 shows a bremsstrahlung spectrum a due to inelastic scattering between electrons and the internal target (1 μm width) in the 50 MeV electron storage ring. For comparison, a spectrum b is shown which is obtained when a large current of 500 mA is accumulated in a compact synchrotron radiation source AURORA.

(G) Mechanism of the Target

The material and shape of the target can be changed in accordance with the purpose of the apparatus. Although the total strength of the bremsstrahlung does not depend on the material or shape of the target so much, the intensity can be increased by narrowing the width of the target. In such a case, the temperature of the target increases considerable as the target becomes narrower. Therefore, a material having a high melting point, low expansion coefficient and high thermal conductivity is preferred as the material of the target. When the target is inserted into a magnetic field, a non-magnetic material is preferably used as the material of the target. For example, tungsten and carbon generally satisfy the above-described requirements. The use of a thin film of diamond is preferred, because it has a large thermal conductivity. The thin film is preferably used in applications such as lithography and angiography in which a high intensity is not needed, but a wide irradiation field is needed and the spatial distribution of the intensity must be flat.

Figure 10A:
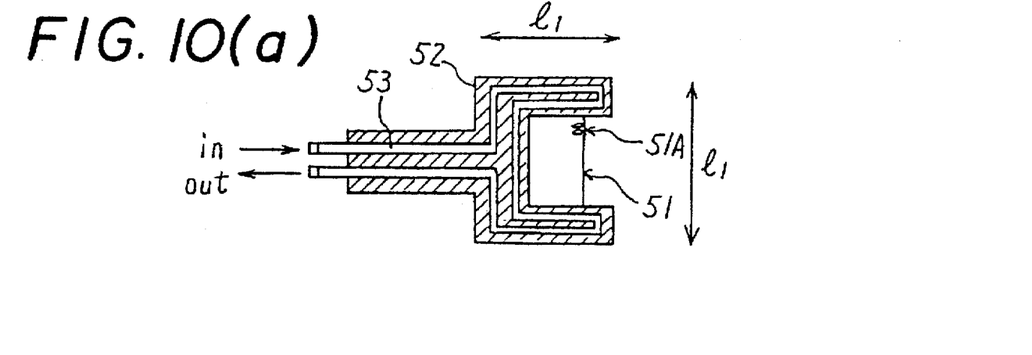
FIG. 10 is a view showing a first embodiment of a wire device of the supper compact electron storage ring shown in FIG. 8.
Figure 10B:
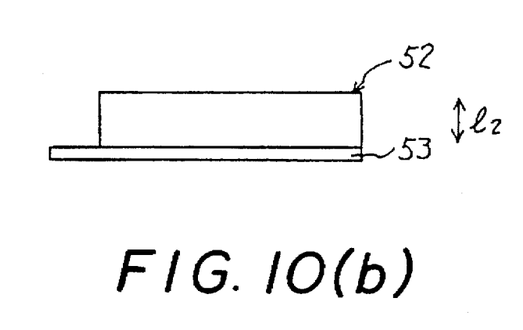

Next, a mechanism for supporting the wire or thin film will be described. When a W-wire of 10 μm is used, the temperature becomes only about 1000° C., so that cooling is not required. However, when the injector is operated in a state in which the peak current is equal to or greater than 10 A and the injection rate is equal to or greater than 100 Hz, it is recommended to provide a cooling mechanism. FIG. 10 shows an example of such a cooling mechanism. In FIG. 10, a cooling passage 53 is provided in a support 52 for a wire 51 serving as a target. When the target is placed in a magnetic field, the support 52 must be made of a non-magnetic material. Phosphor bronze is preferably used because of its small expansion coefficient. To prevent the wire 51 from being broken due to expansion, a spring mechanism 51A may be attached to the wire 51. In the target shown in FIG. 10, the width $l_1$ is 30 mm, and the height $l_2$ is 10 mm.

Figure 11A:
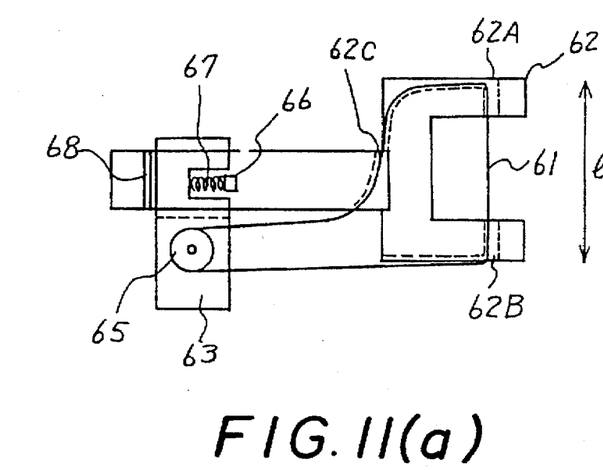
FIG. 11 is a view showing a second embodiment of the wire device of the supper compact electron storage ring shown in FIG. 8.
Figure 11B:
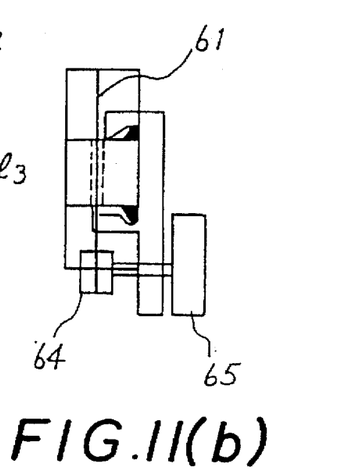

To improve the efficiency in cooling the wire, a wire 61 serving as the target is moved as shown in FIG. 11. The endless wire 61 to which tension is applied is guided by guide grooves 62A, 62B and 62C of a support 62 and is wound around a wheel 65. The wheel 65 is driven by an ultrasonic motor 65 which is provided on a tension mechanism 63, for example. Further, a compression spring 67 is disposed between a projection 66 of the support 62 and the tension mechanism 63, and the tension mechanisms 63 rests on a stopper 68 of the support 62. That is, the wire 61 is prevented from loosening by applying a predetermined tension thereon. In FIG. 11, $l_3$ is 30 mm.

The wire 61 is cooled when it passes though the guide grooves 62A, 62B and 62C of the support 62 having a cooling mechanism (not shown). Although the speed of movement of the wire 61 is determined based on the speed of increase of the temperature, a speed of about 10 cm/min is sufficient.

Figure 12:
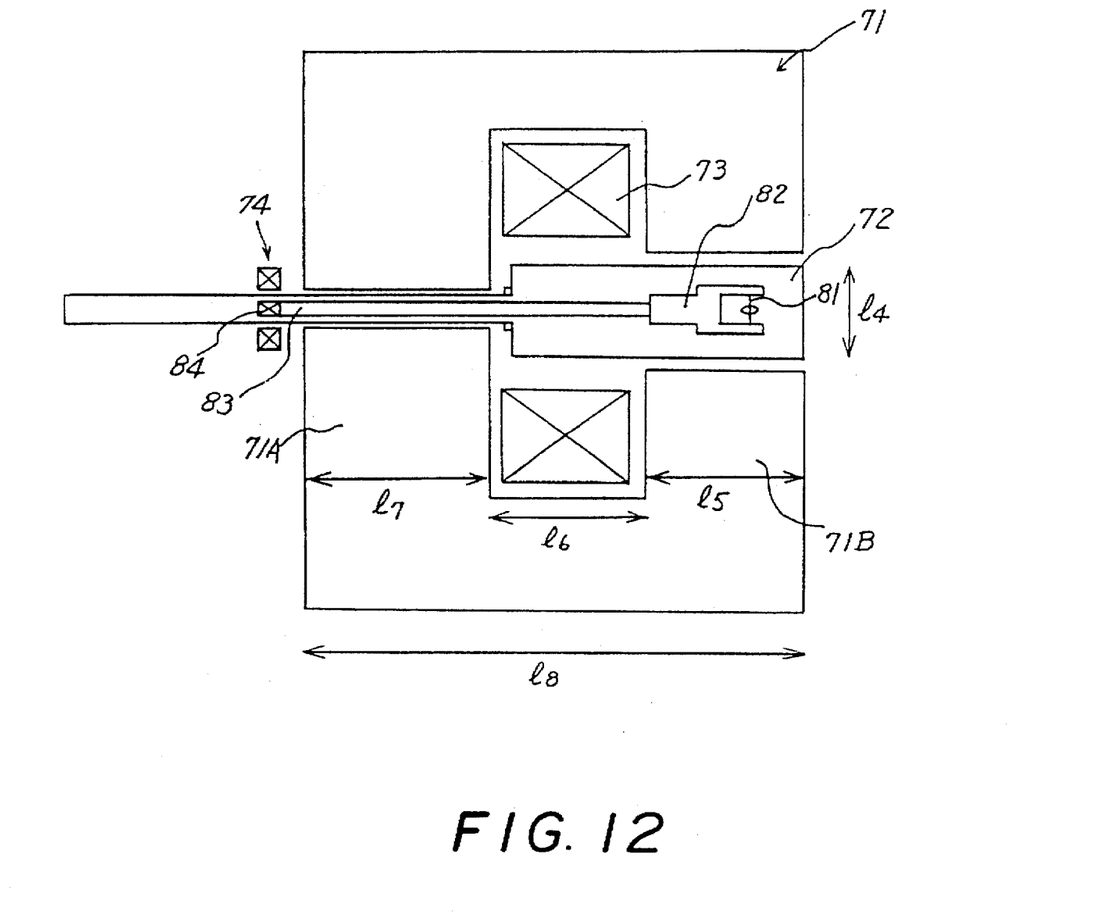
FIG. 12 is a view showing a third embodiment of the wire device of the supper compact electron storage ring shown in FIG. 8.

FIG. 12 shows a state in which a wire drive mechanism is attached to the beam duct. In case of a completely circular electron storage ring, the drive mechanism is attached through a yoke 71A of a magnet 71. In detail, a wire 81 serving as a target is disposed on the center of the electron beam orbit formed by the magnetic poles 71B. A support 82 for the wire 81, a transfer rod 83 connected to the support 82, and a magnet 84 attached to the end of the transfer rod 83 are provided, and are housed in a vacuum container 72. A coil 73 is disposed at the central portion of the magnet 71. Further, an electromagnet device 74 is disposed to move the transfer rod 83. In FIG. 12, $l_4$ is 60 mm, $l_5$ is 200 mm, $l_6$ is 150 mm, $l_7$ is 150 mm, and $l_8$ is 500 mm.

As described above, the transfer rod 83 can be directly attached to the vacuum container 72. The electromagnet device 74 cooperates with the magnet 84 to move the transfer rod 83, thereby advancing and retracting the wire 81 serving as the target. Instead of the transfer rod, other various mechanism such as a rotary mechanism can be employed.

This mechanism is used to retract the wire 81 when no bremsstrahlung is generated.

The target is provided at a plurality of locations in the electron storage ring, and is preferably retracted when it is not used.

Instead of the thin film or wire, a strip, laminated material, or crystals may be used as the target.

As have already been described, the total amount of the bremsstrahlung which can be generated by a single electron storage ring is a constant. Therefore, when the number of the targets is decreased, the amount of radiation at each location increases accordingly. When radiation of high-intensity is needed, only one target is inserted to maximize the amount of radiation.

In the above-described 50 MeV electron storage ring, $\gamma$ is 100, and the spread angle is $\pm 10$ mrad. One of the features of the apparatus is that it has a wide radiation angle even though it provides a high intensity. Since the size of the light source is small in spite of its large radiation angle, an x-ray beam having a higher intensity can be obtained by focusing the beam with a Walter mirror. Since the brilliance is important in ordinary analyses, a condensing mirror is preferably introduced. However, when a wide irradiation field is needed as in angiography for medial use, and x-ray lithography for manufacture of super ULSI, the above-mentioned wide radiation angle is convenient. The problem in the use of synchrotron radiation is that the field of view becomes too narrow due to excessively high directivity. To widen the field of view, an object is scanned, or a mirror is employed. In such an apparatus, a sufficient field of view of about 30×30 cm can be obtained without employing the above-described mechanism.

In the field of nuclear power, a technology for extinguishing nuclei for radioactive waste disposal has been watched with keen interest. To extinguish nuclei, $\gamma$ rays having an energy greater than 15 MeV are needed. Since the efficiency can be maximized by using monochromatic $\gamma$ rays, several methods have been studied to use monochromatic $\gamma$ rays. In one method, a laser beam is caused to collide head-on with an electron beam to convert the wavelength of the laser beam due to reverse Compton scattering. However, since the scattering cross-sectional area is very small, a desired amount of flux has not been obtained so far. As shown in FIG. 9, the output from the apparatus of the present invention exhibits a continuous spectrum. Therefore, the scattering cross-sectional area of the bremsstrahlung becomes over 10000 times that of the reverse Compton scattering although the overall output efficiency for a desired wavelength is lower than that in the case of utilizing the reverse Compton scattering. At the present, there is no practical $\gamma$-ray source other than the apparatus of the present invention.

The present invention is not limited to the above-described embodiment, and may be modified in various way based on the concept of the present invention. Therefore, modifications and variations of the embodiments should not be excluded from the scope of the present invention.

As described above, the present invention provides the following effects:

(1) A low energy electron beam can be stabilized, and a large current can be accumulated. In addition, a synchrotron radiation apparatus can be made a considerably compact.

(2) Due to scattering between an electron beam and gas, a high-intensity bremsstrahlung ranging from a short wavelength in the range of hard x-rays to a long wavelength in the range of infrared rays can be generated in a super compact electron storage ring.

(3) Radiation light, coherent synchrotron radiation and a bremsstrahlung which have a pulsewidth of a sub-picosecond order can be generated by shortening the bunch length of an electron beam of a large current and low energy.

(4) In a low energy electron storage ring, ions are utilized to suppress instability of a beam and to increase the amount of the accumulated current. In addition or alternatively, the bremsstrahlung is utilized to provide damping and cooling effect. Accordingly, the output of an insertion-type free-electron laser or a photon storage ring-type free-electron laser can be stabilized while increasing their outputs.

(5) Since a thin film or wire of a few tens μm is inserted, as a target, into an orbit of the electron storage ring to generate a bremsstrahlung, a high-intensity x-ray source of a laboratory size can be provided, which greatly changes the manner of using x-rays. That is, a user can have the x-ray source to his/herself. In x-ray lithography, an x-ray source can be built in an existing light process line. Also, angiography can be realized in hospitals. Use of large common facilities for generating x-rays has not reached a practical level in the medical field. Therefore, the apparatus of the present invention is expected to be used in such a field. Moreover, a compact high-intensity x-ray source makes it possible to check defects of a large structure such as an airplane. Thus, it is predicted that hard x-rays will be used in widened areas.

As described above, it becomes possible to utilize high-intensity x-rays by using an apparatus which can be put on a table. This solves the problem that the use of high-intensity x-rays can conventionally be performed only at very large facilities of national laboratories. In addition, it becomes possible to use hard x-rays of a 100 keV level, which is difficult to generate even at those facilities. Moreover, although hard x-rays are conventionally used in the fields of (1) analyzing, (2) fine machining, and (3) photochemistry, they can be used in the fields of (4) medical diagnoses and treatment, and (5) applications related to atomic power.

What is claimed is:

1. A method of generating radiation, comprising the steps of:
   (a) introducing a gas having a pressure equal to or greater than $10^{-9}$ Torr into an electron orbit in an electron storage ring; and
   (b) generating radiation by the action of an electron beam circulating in said electron storage ring and said gas.

2. A method of generating radiation according to claim 1, wherein said gas is ionized to focus said electron beam, thereby accumulating a large current electron beam.

3. A method of generating radiation according to claim 1, wherein said electron beam circulating in said electron storage ring is caused to collide with said gas so as to generate a bremsstrahlung.

4. A method of generating radiation according to claim 1, wherein said circulating electron beam is caused to collide with said gas so as to ionize the gas and generate a bremsstrahlung, so that the bunch length of said electron beam is shortened to promote generation of short pulse synchrotron radiation and coherent synchrotron radiation.

5. A method of generating radiation according to claim 1, wherein said circulating electron beam is caused to collide with said gas so as to ionize said gas and generate a bremsstrahlung, thereby increasing the output of a laser.

6. A method of generating radiation according to claim 1, wherein hydrogen gas is used as said gas.

7. A method of generating radiation according to claim 1, wherein an electron beam is continuously injected from the outside without disturbing electrons on an center electron orbit in said electron storage ring so as to accumulate a large current electron beam.

8. A method of generating radiation, comprising the steps of:
   (a) disposing a target on an electron orbit in an electron storage ring; and
   (b) causing an electron beam circulating along said electron orbit to hit said target, thereby generating a bremsstrahlung and high-intensity radiation.

9. A method of generating radiation according to claim 8, wherein an electron beam is continuously injected from the outside without disturbing electrons on an center electron orbit in said electron storage ring so as to accumulate a large current electron beam.

10. An apparatus for generating radiation comprising:
    (a) an electron storage ring;
    (b) means for introducing a gas into an electron orbit in said electron storage ring so as to adjust a gas pressure;
    (c) means for ionizing said gas by using a circulating electron beam and causing ions to stay on said electron orbit; and
    (d) means for continuously or intermittently injecting an electron beam by using an injector.

11. An apparatus for generating radiation according to claim 10, wherein said electron storage ring has a magnet, a particle accelerator and a beam duct, thereby stabilizing the electron beam to accumulate a large current electron beam, generating high-intensity radiation utilizing a bremsstrahlung caused by scattering of the gas and electrons, and/or generating high-intensity synchrotron radiation including coherent synchrotron radiation.

12. An apparatus for generating radiation according to claim 10, wherein said electron storage ring is provided with an insertion-type free-electron laser utilizing a straight portion of said electron storage ring, or an optical resonator having no straight portion, so as to stabilize the electron beam and accumulate a large current electron beam, thereby increasing the output of a laser.

13. An apparatus for generating radiation according to claim 10, further comprising means for injecting the electron beam without disturbing electrons on a center electron orbit in said electron storage ring.

14. An apparatus for generating radiation comprising:
    (a) an electron storage ring having a magnet, a particle accelerator, and a beam duct;
    (b) means for introducing a target into an electron orbit of said electron storage ring;
    (c) means for continuously or intermittently injecting an electron beam by using an injector so as to accumulate a large current electron beam; and
    (d) means for generating high-intensity radiation utilizing a bremsstrahlung caused by scattering between said target and electrons.

15. An apparatus for generating radiation according to claim 14, wherein a thin film or a wire is used as said target.

16. An apparatus for generating radiation according to claim 14, wherein a support for said target is provided with cooling means.

17. An apparatus for generating radiation according to claim 14, further comprising means for moving said target.

18. An apparatus for generating radiation according to claim 14, further comprising means for retracting said target from the electron beam orbit.

* * * * *